US006352659B1

(12) United States Patent
Clark et al.

(10) Patent No.: US 6,352,659 B1
(45) Date of Patent: Mar. 5, 2002

(54) VENTED MOLD AND METHOD FOR PRODUCING A MOLDED ARTICLE

(75) Inventors: Leslie E. Clark, Cambridge; Craig A Hunter, Milton, both of (CA); Donald J. McFarland, O'Fallon, MO (US); Harold W Freitag, Jr., Novi; Christopher A. Leite, Ann Arbor, both of MI (US)

(73) Assignee: Woodbridge Foam Corporation, Mississauga (CA)

( * ) Notice: Subject to any disclaimer, the term of this patent is extended or adjusted under 35 U.S.C. 154(b) by 0 days.

(21) Appl. No.: 09/424,795

(22) PCT Filed: May 29, 1998

(86) PCT No.: PCT/CA98/00521

§ 371 Date: Jun. 2, 2000

§ 102(e) Date: Jun. 2, 2000

(87) PCT Pub. No.: WO98/53970

PCT Pub. Date: Dec. 3, 1998

(51) Int. Cl.[7] .......................... B29C 44/02; B29C 33/10
(52) U.S. Cl. .......................... 264/51; 29/91.1; 249/134; 249/141; 264/276; 425/4 R; 425/812; 425/817 R
(58) Field of Search .................. 264/51, 276; 425/4 R, 425/817 R, 812; 249/141, 134; 29/91.1

(56) References Cited

U.S. PATENT DOCUMENTS

| 4,501,541 A | * | 2/1985 | Bethell et al. ............... 425/812 |
| 4,959,184 A | * | 9/1990 | Akai et al. .................. 264/40.3 |
| 4,976,414 A | * | 12/1990 | Yanagishita ................ 264/40.3 |
| 5,281,383 A | * | 1/1994 | Ueki et al. ................... 425/812 |
| 5,356,580 A | * | 10/1994 | Clark et al. .................... 264/51 |
| 5,449,698 A | * | 9/1995 | Mabuchi et al. ............. 425/812 |
| 5,464,582 A | * | 11/1995 | Okano et al. ................. 264/102 |
| 5,482,721 A | * | 1/1996 | Clark et al. .................. 425/4 R |
| 5,587,183 A | * | 12/1996 | Clark et al. .................. 425/4 R |
| 5,965,169 A | * | 10/1999 | Hirata et al. ................. 425/812 |
| 5,997,783 A | * | 12/1999 | Hunter et al. ................ 425/812 |

* cited by examiner

Primary Examiner—Allan R. Kuhns
(74) Attorney, Agent, or Firm—Katten, Muchin & Zavis

(57) ABSTRACT

A mold (100) for producing foamed articles is described. The mold comprises an upper mold and a lower mold (102) releasingly engageable in a closed position to define a mold cavity (106) having a parting line about a periphery of the mold cavity. The parting line of the mold defines: (i) a first channel (108) along a first length of a periphery of the mold cavity, and (ii) a second channel (110) in communication with first channel, the second channel having a second length which is less than the first length. A method for producing a molded article use is also described. The subject mold and method are particularly well suited for the production of molded foam (e.g, polyurethane) articles.

35 Claims, 6 Drawing Sheets

VENTED MOLD AND METHOD FOR PRODUCING A MOLDED ARTICLE

FIELD OF THE INVENTION

The present invention relates to a vented mold and to a method for producing a mold article.

DESCRIPTION OF THE PRIOR ART

Many articles are manufactured by placing a raw material into a cavity in a mold wherein the raw material undergoes a physical change (e.g., it expands or foams) and the article produced thus acquires the shape of the cavity. In particular, this technique is commonly employed for producing foamed articles made from polymeric foams such as polyurethane foam, latex (e.g., natural and styrene-butadiene rubber) foam and the like.

For example, automotive seats are commonly manufactured from polyurethane cushions which are molded to shape and then covered with a vinyl, cloth or leather finish cover. Polyurethane foams are somewhat unique in that foaming and at least a portion of the polymerization process occur simultaneously. Thus, in the production of polyurethane foam using, for example, a conventional cold foam technique, a typical formulation comprises:

1. Polyol
2. Water
3. Tetramethyl ethane diamine
4. Dimethyl ethanol amine
5. Polyisocyanate The mixture is dispensed into a mold using a suitable mixing head, after which the mold is then closed to permit the expanding mass within it to be molded. Accordingly, it is convenient generally to refer to the mixture initially dispensed into the mold as "a liquid foamable polymeric composition" or, in this case, "a liquid foamable polyurethane composition". As the composition expands in the mold, polymerization occurs and the polymer so formed becomes solidified.

When molding a liquid foamable polymeric composition to form articles, such as polyurethane foam articles, it is conventional to use a clam-shell mold comprising a bottom mold and a top mold which, when closed, define a mold cavity. The mold is opened, the liquid foamable polyurethane composition is dispensed into the mold cavity and the mold is closed as a chemical reaction causes the composition to expand. After the mold is closed, the composition expands to fill the interior cavity of the mold. Alternatively, the composition may be dispensed into a closed mold. In either case, as the polymerization reaction is completed, the foam cures and permanently assumes the shape of the mold cavity.

As is known to those of skill in the art, it is essential during this process that the mold be adequately vented to allow the air present in the mold to exit the mold as the foamable composition expands. Further, it is essential to allow a portion of the gases (typically $CO_2$ in the production of polyurethane) generated during polymerization to exit the mold.

Failure to adequately vent the mold results in defective molded articles exhibiting symptoms of improper foaming such as surface hardening (or foam densification) and/or void formation in the finished article due to trapped gas or air bubbles. At the other extreme, excess venting of the mold will also result in defective molded articles due to collapse of the foam prior to curing; this phenomenon is often referred to as the 'soufflé' effect. Thus, proper venting of molds is an important factor in producing acceptable molded articles.

Typically, first generation clam-shell molds have been designed with drilled or cut passages in the top mold to provide vents. Locating, sizing and deciding upon the number of these vents is a matter of some skill on the part of mold designer and the production engineers, and is often an iterative procedure with more vents being added to various locations or other vents being blocked-off after test runs have been made.

During molding operations some liquid foamable polymeric composition which moves into the vent is wasted. It is generally desired to minimize the amount of wasted material (also known as "flash","mushrooms","buds", "pancakes" and the like) for two reasons, namely (1) the wasted material adds to the overall expense of producing the finished article, and (2) the wasted material must be removed from the molded article prior to the finish cover being applied, thereby necessitating additional labour and the costs associated therewith.

As will be developed below, improvements to venting during such molding operations have advanced the art to a certain degree. However, mold designers and production engineers are continually striving to optimize the compromise between providing enough venting at the proper locations while avoiding excess venting and minimizing material wastage during venting.

SUMMARY OF THE INVENTION

It is an object of the present invention to provide a novel mold for producing molded articles.

It is another object of the present invention to provide a novel method for producing a molded article.

Accordingly, in one of its aspects, the present invention provides a mold for producing foamed articles, the mold comprising an upper mold and a lower mold releasingly engageable in a closed position to define a mold cavity having a parting line about a periphery of the mold cavity, the parting line defining: (i) a first channel along a first length of a periphery of the mold cavity, and (ii) a second channel in communication with first channel, the second channel having a second length which is less than the first length.

In another of its aspects, the present invention provides a method of producing an article in a mold comprising an upper mold and a lower mold releasingly engageable in a closed position to define a mold cavity having parting line about a periphery thereof the method comprising the steps of:

dispensing a liquid foamable polymeric composition into the mold cavity;

closing the upper mold and the lower mold;

allowing the liquid foamable polymeric composition to expand to substantially fill the mold cavity;

venting gases in the mold cavity through a combination comprising: (i) a first 30 channel along a first length of the periphery of the mold cavity, and (ii) a second channel in communication with first channel, the second channel having a second length which is less than the first length.

BRIEF DESCRIPTION OF THE DRAWINGS

Embodiments of the present invention will be described with reference to the accompanying drawings, wherein like reference numerals denote like parts and in which.

DETAILED DESCRIPTION OF THE PREFERRED EMBODIMENTS

The most preferred liquid foamable polymeric composition is based upon polyurethane, which will be referred throughout this specification. However, it will be apparent to those of skill in the art that the present invention is applicable to other types of molding operations including, but not limited to, latex foam, neoprene foam, PVC foams and the like.

A first generation prior art mold will first be discussed, with reference to FIGS. 1 and 2, and then a second generation prior art mold will then be discussed, with reference to FIGS. 3 and 4.

Figure 1:
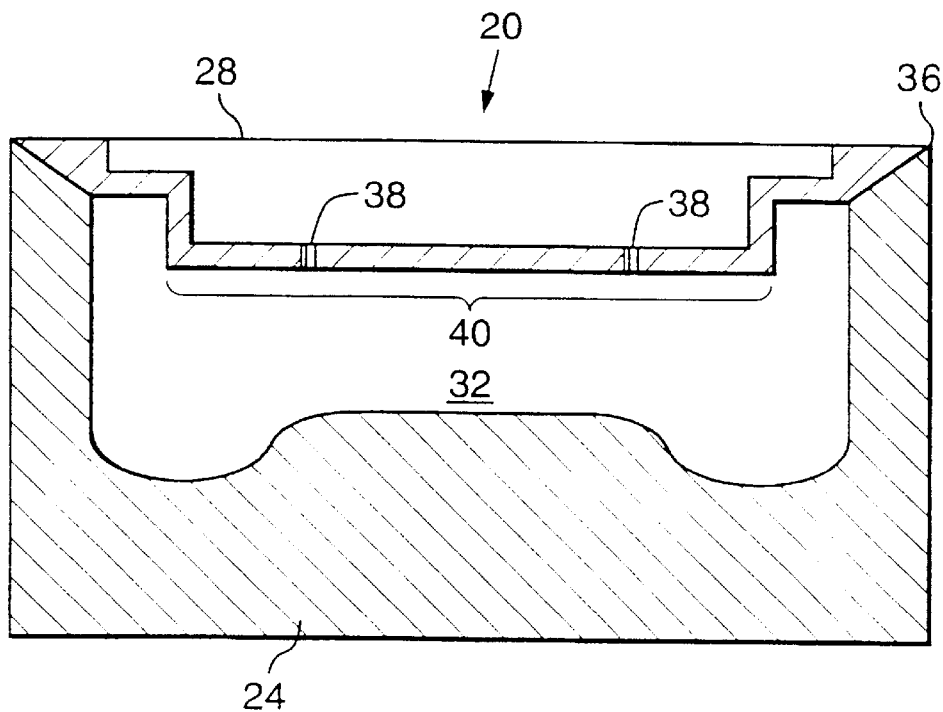
FIG. 1 illustrates a cross-section of a first generation prior art clam-shell mold.
Figure 2:
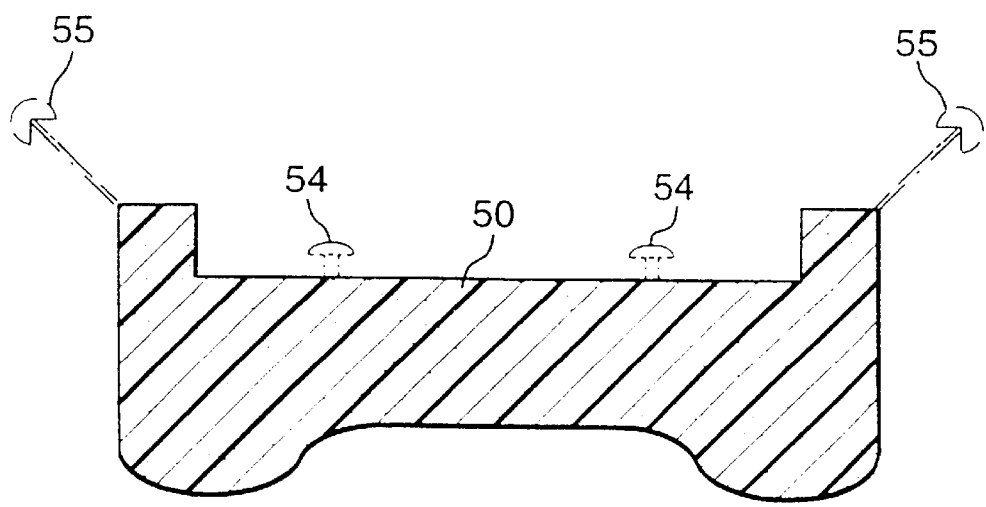
FIG. 2 illustrates an article produced in the prior art mold of FIG. 1.

With reference to FIGS. 1 and 2, a typical clam-shell mold, similar to those used for forming an automotive seat cushion from polyurethane foam, is indicated generally at 20 in FIG. 1. The mold includes a lower mold 24 (also known in the art as a "bowl") and an upper mold 28 (also known in the art as a "lid") which are joined by a conventional hinge or other means (not shown). Lower mold 24 and upper mold 28, when closed, define a cavity 32 which corresponds to the shape of the automotive seat cushion.

In use, upper mold 28 is released from lower mold 24 and a pre-determined amount of liquid foamable polyurethane composition is dispensed into lower mold 24. Upper mold 28 and lower mold 24 are closed and engaged to seal the mold, and the liquid foamable polyurethane composition expands, displacing the air within cavity 32. This displaced air exits cavity 32 through a relatively large parting line vent 36 and through one or more vent passages 38 in upper mold 28. Further, as the polyurethane composition expands, polymerization of the composition occurs along with the evolution of gaseous $CO_2$ in cavity 32. This gaseous $CO_2$ may also exit cavity 32 through parting line 36 and through vent passages 38. As is well known to those of skill in the art (and beyond the scope of this discussion), the liquid foamable polymeric composition eventually completely polymerizes and cures, acquiring the shape of cavity 32.

As is also known to those of skill in the art, the amount of liquid foamable polyurethane composition dispensed in cavity 32 must be selected to ensure that cavity will be substantially completely filled, in order to avoid the occurrence of voids and other foaming defects in the molded article. While the determination of the proper amount of liquid foamable polyurethane composition for a particular mold may generally be calculated, when using a first generation mold such as mold 20, it has heretofore been required to dispense an excess amount of polymeric composition into the mold to compensate for material which moves through and exits parting line vent 36 and vent passages 38. This excess, while assisting in ensuring that cavity 32 is filled to avoid the occurrence of voids and other foaming defects in the molded articles, is in fact simply a wastage of valuable raw material.

In these first generation prior art molds, during the molding operation, air and the reaction gases produced from the expanding composition exit from cavity 32 through parting line vent 36 and vent passages 38 until the foam reaches the level of their respective entrances.

At this point, any further expansion of the foam results in movement of the foam into parting line vent 36 and/or vent passages 38. In the simplest case of a cavity without irregularities, the foam reaches the level of the parting line vent and/or the vent passages at approximately the same time, which usually occurs at or near the maximum expansion point of the foam. Thus, provided that the proper amount of liquid foamable polyurethane composition has been dispensed into the cavity, only a small amount of foam enters the parting line vent and/or the vent passages as cavity 32 is completely filled.

In practice, however, as shown in FIG. 1, most molds include irregularities in their cavities for various features required on the molded article. In such a case, the thickness and shape of mold cavity 32 typically varies across the cavity and the entrance to parting line vent 36 and vent passages 38 in the mold may thus be located at different heights depending upon where they communicate with cavity 32. Further, localized areas of high and low pressure also occur within cavity 32 due to the manner in which the foam and the gases produced collect in and move between the irregularities therein and thus the level of foam in different parts of cavity 32 at different times may vary.

Due to the above-mentioned factors, the foam in the cavity typically reaches the level of the parting line vents and/or different vent passages at different times while the foam is still expanding. For example, in a region wherein the top of cavity 32 is lower than surrounding regions, such as indicated at 40 in FIG. 1, the foam may quickly reach the vent passages 38. As the foam is still rising in the rest of cavity 32 and has not yet cured, a relatively significant amount of foam may enter vent passages 38 in this region.

Again, as the amount of foam which enters parting line vents 36 and vent passages 38 reduces the amount of foam remaining in cavity 32 by a like amount, it is necessary that the amount of liquid foamable polyurethane composition placed in cavity 32 include an amount in excess of that required to fill cavity 32 to offset the foam which entered the parting line and vents. This excess amount, while necessary for proper operation of the prior art mold, is essentially wasted material and adds to the cost of forming the article.

Further, as shown in FIG. 2, the foam which enters vent passages 38 forms "mushrooms" 54 (shown in ghosted line) of wasted material on the molded article 50. Further, the material which enters parting line vents 36 forms "pancakes" 55 of wasted material on the molded article 50. Typically, mushrooms 54 and pancakes 55 must be disconnected from article 50 and removed from the mold 20 prior to application of a finish cover to ensure a finished covered article which is of acceptable appearance and texture, and to prepare mold 20 for re-use. The necessity of removing mushrooms 54 and pancakes 55 results in an increased labour cost associated with manufacturing the molded product.

In addition to the excess liquid foamable polyurethane composition which is added to offset the material extruded into the vents, excess liquid foamable polyurethane composition is also added to compensate for process variations due to changes in temperature, humidity, ambient pressure and minor changes in the composition of the liquid foamable polyurethane composition. Accordingly, in these first generation prior art molds, the wastage of material exiting the vents is inevitable.

In U.S. Pat. Nos. 5,356,580, 5,482,721 and 5,587,183 [collectively referred to as "the Clark et al. patents"], the contents of each of which are hereby incorporated by reference, there is disclosed a second generation mold. With references to FIGS. 3 and 4 hereof, a discussion of this second generation mold will follow.

Figure 3:
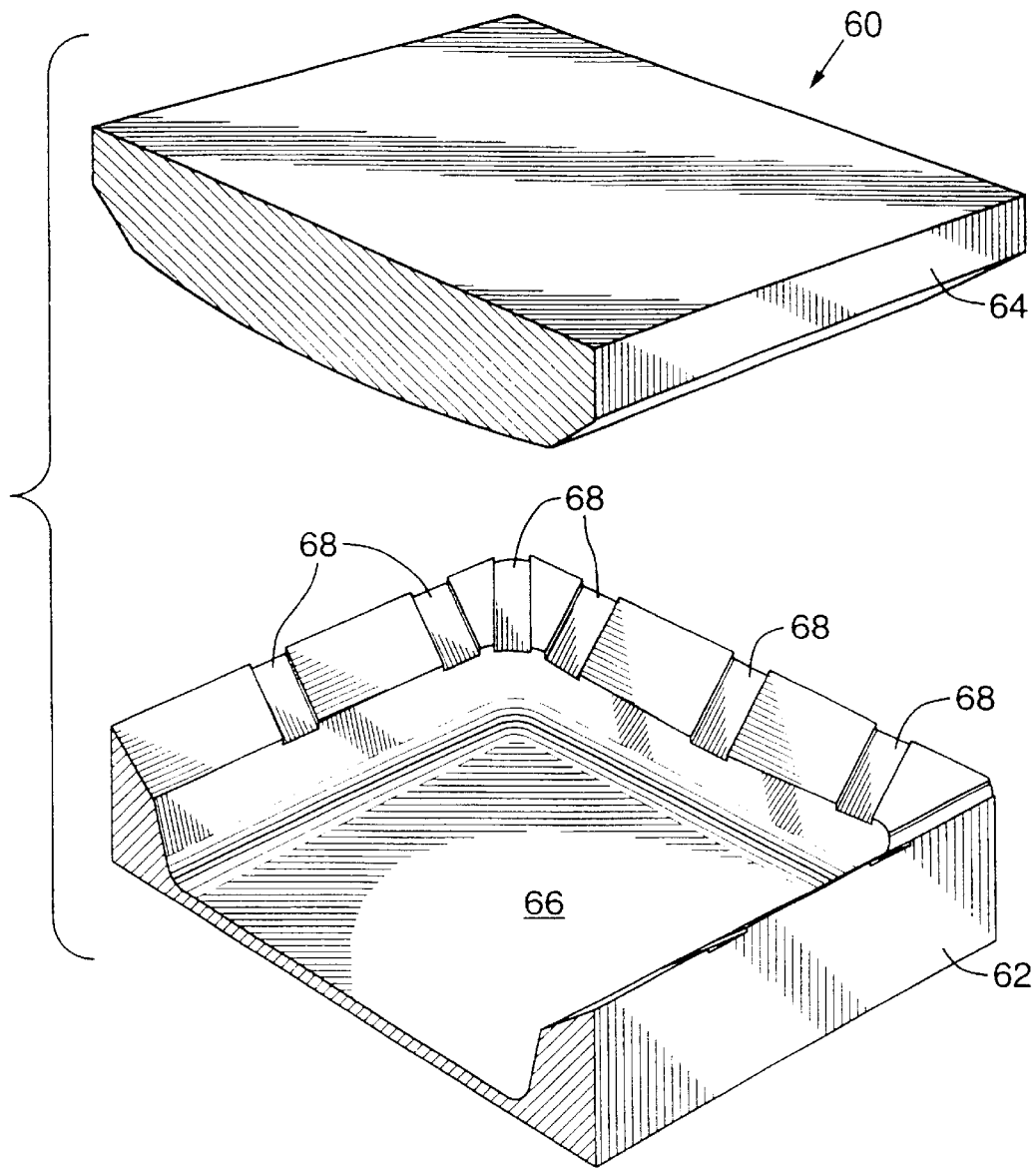
FIG. 3 illustrates a perspective view of a second generation prior art clam-shell mold.

With reference to FIG. 3, a clam-shell mold is indicated generally at 60. Mold 60 includes a lower mold 62 and an upper mold 64 which define a mold cavity 66. The mold includes a series of ribbon vents 68. Ribbon vents 68 extend between mold cavity 66 and the exterior of mold 60.

In use, liquid foamable polyurethane composition is dispensed into mold cavity 66, and upper mold 62 and lower mold 64 are sealingly engaged. The air in mold cavity 66 and the gases produced by the chemical reaction occurring in the expanding composition are vented through ribbon vents 68. The viscosity of these gases are such that they flow relatively easily through ribbon vents 68. Once the level of foam in mold 60 reaches the entrance to ribbon vents 68, the foam enters ribbon vents 68. Due to the presentation of a restriction by ribbon vent 68 to the expanding composition, the latter can only move slowly through ribbon vents 68. Provided that the thickness of ribbon vents 68 has been properly selected, the liquid foamable polymeric composition will stop moving therein before it travels a significant distance along the vents and before it reaches the end of ribbon vents 68.

Figure 4:
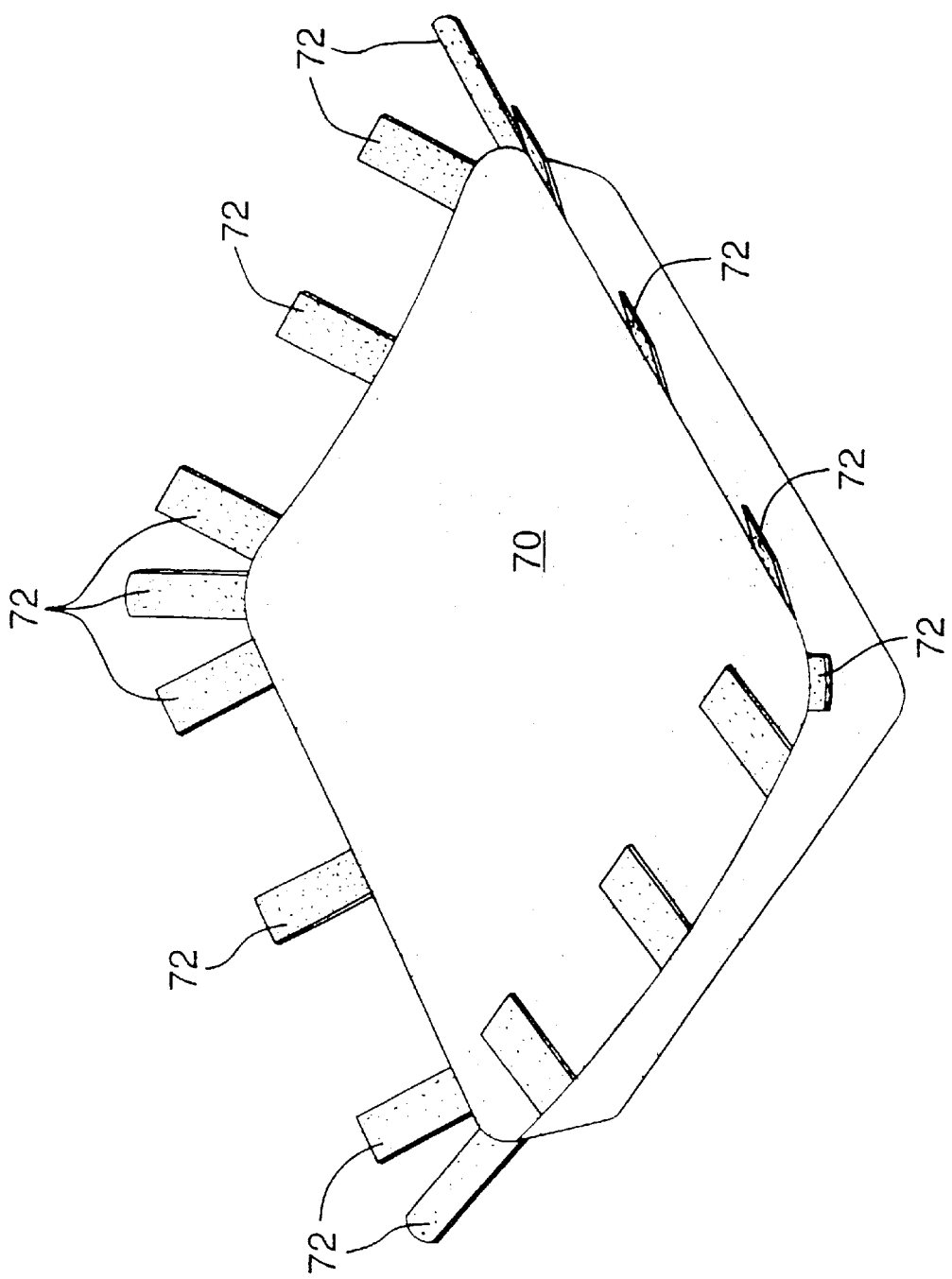
FIG. 4 illustrates an article produced in the prior art mold of FIG. 3.

FIG. 4 illustrates an article 70 fabricated in the second generation prior art mold of FIG. 3 employing ribbon vents 68. As illustrated, article 70 includes a number of ribbons 72 of extruded material from ribbon vents 68.

The principal advantages provided by ribbon vents 68 are: (i) reduction of the amount of raw material wasted with a resultant economic saving (i.e., resulting from limited amount of material extruded into ribbon vents 68), and (ii) ribbons 72 of extruded material produced by the ribbon vents 68 have a preferred, 'friendly' shape (i.e., when ribbon vents 68 with relatively a small thickness are employed, the resulting ribbons 72 of extruded material may simply be folded back against article 70 when the finish cover is applied to it while maintaining an acceptable appearance and texture—an example of such folded back ribbons is indicated at 72a), thereby obviating the need to remove the ribbons 72 of extruded material resulting in a labour savings.

While the second generation mold prior art mold disclosed in the Clark et al. patents are a significant advance in the art there is still room for improvement. Specifically, in some instances, the plurality of ribbons 72 is visually unappealing and in other instances the presence of the plurality of ribbons 72 can complicate the seat assembly process (i.e., the ribbons 72 can interfere with the downstream trim cover close out mechanisms). Thus, the present inventors have sought to overcome these difficulties by seeking an alternative way in which to vent the mold which either completely eliminates the ribbon or allows the ribbons to be relocated to an acceptable position on the article being manufactured.

The present mold comprises what may be regarded as a parting line channel vent disposed along at least a portion of the periphery mold cavity. The channel vent comprises a first channel having a first length in communication with the mold cavity and a second channel in communication with first channel and having a second length shorter than the first length. In other words, the length of the second channel is less than the length of the first channel.

Figure 5:
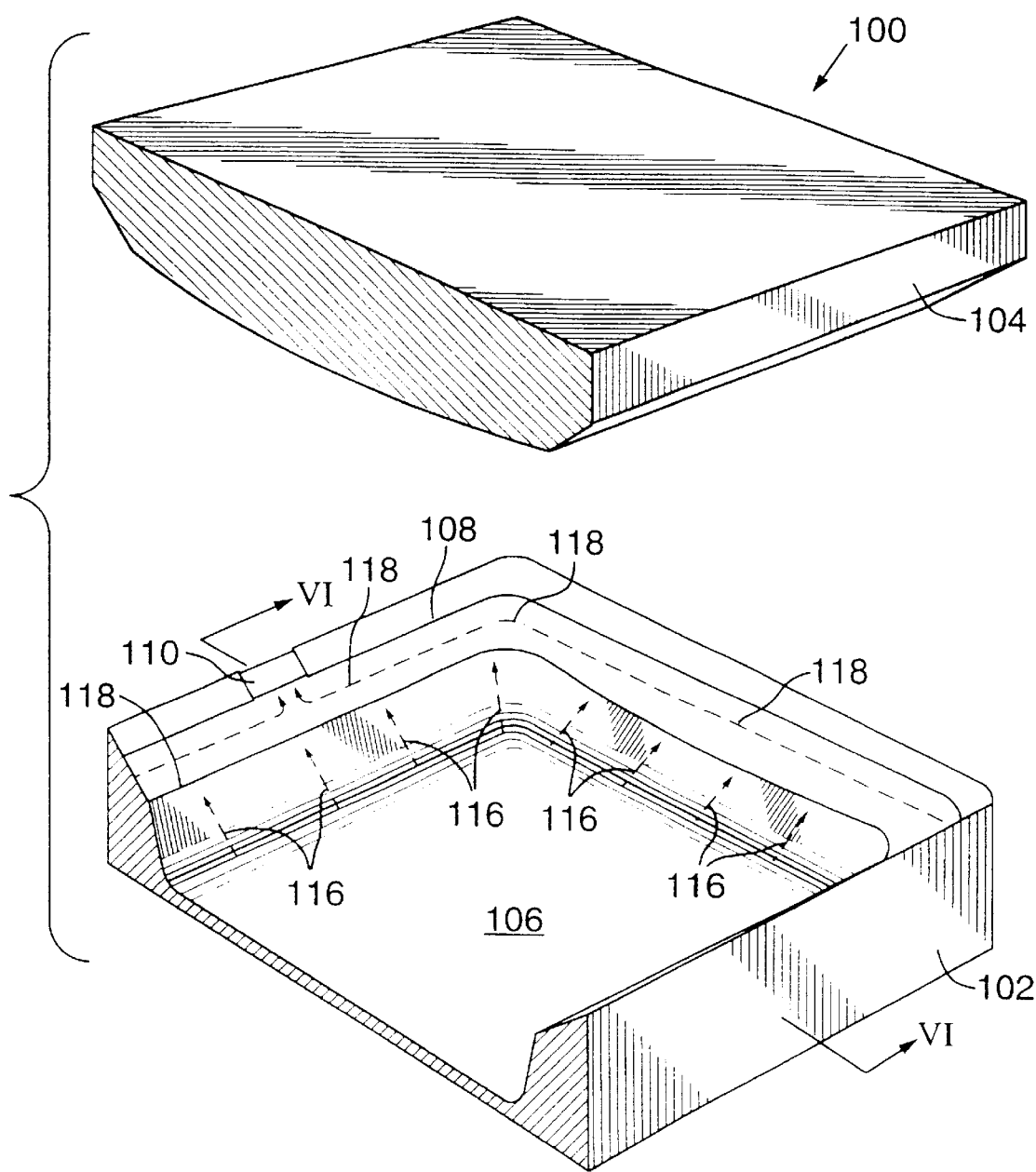
FIG. 5 illustrates a perspective view of clam-shell mold in accordance with the present invention.
Figure 6:
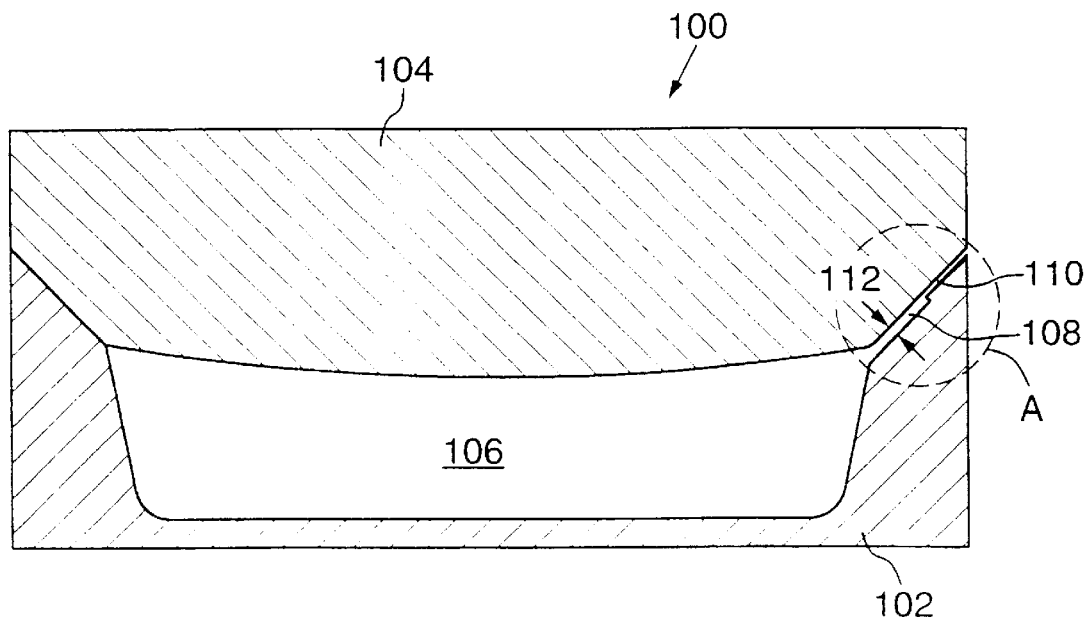
FIG. 6 illustrates a section taken along line VI—VI when the mold of FIG. 5 is closed.

With reference to FIGS. 5 and 6, there is illustrated a preferred mold 100 in accordance with the present invention. Mold 100 comprises a lower mold 102 and an upper mold 104 which are engageable to define a mold cavity 106. The lower mold 102 includes a first channel vent 108 and a second channel vent 110. In the illustrated embodiment, first channel vent 108 is disposed along the entire length of (only) two adjacent sides of lower mold 102. Those of skill in art will appreciate that the disposition and length of first channel vent 108 on lower mold 102 can be varied without departing from the spirit and scope of the present invention.

Thus, if the mold cavity is shaped to have one or more distinct sides (e.g., polygon-shaped such as substantially rectangular), it is possible to dispose first channel 108 along at least a portion of one side of the periphery of the mold cavity (of course the specific shape of the mold cavity is not restricted). Preferably, first channel vent 108 is disposed along at least a portion of two sides of the periphery of the mold cavity. In some situations, first channel vent 108 may be disposed along one entire side of the periphery of the mold cavity. In other situations, first channel vent 108 may be disposed along an entire side and at least a portion of one adjacent side of the periphery of the mold cavity. In yet other situations, first channel vent 108 may be disposed along the entire periphery of the mold cavity. The disposition and length of first channel vent 108 depends on the nature of the liquid foamable polymeric composition being used and the type part being made, and may be readily determined by those of skill in the art through empirical calculations and/or testing.

Preferably, first channel vent 108 has a length (i.e., the distance between opposed sides of the channel) greater than about 1 inch. More preferably, first channel vent 108 has a length greater than about 3 inches, even more preferably greater than about 5 inches, most preferably greater than about 6 inches.

With further reference to FIG. 5, those of skill in the art will recognize that a single passageway, namely second channel vent 110, is all that connects mold cavity 106 (via first channel vent 108) with the exterior of mold 100. As will be developed below, the placement of second channel vent 110 along the length of first channel vent 108 is not particularly critical unlike the molds in the Clark et al. patents wherein the placement of ribbon vents is dictated primarily by the need to achieve adequate venting without particular regard to the affect of ribbons attached to the product on downstream production steps. As will be apparent to those of skill in the art, to maximize some of the advantages accruing from the present invention, the number of second channel vents 110 will be minimized and is preferably one or two.

Broadly, the length second channel vent 110 (i.e., the distance between opposed sides of the channel) is not particularly restricted provided that it is less then the length of the first channel. Preferably, the length of the second channel vent is less than about 3 inches, more preferably less than about 2½ inches, most preferably less than about 2 inches.

With reference to FIG. 6, it will be apparent that the respective thickness of first channel vent 108 and second channel vent 110 are different. Specifically, first channel vent 108 is thicker than second channel vent 110. This is a preferred feature of the present invention and improves the robustness of ribbon material produced in first channel vent 108 such that it does not readily tear away from the article upon demolding this—allows for a relatively self-cleaning mold. Preferably, first channel vent 108 has a thickness 112 in the range of from about 0.005 to about 0.040 inches, more preferably in the range of from about 0.007 to about 0.035 inches. Those of skill in the art will recognize that first channel vent 108 and second channel vent 110 may be of substantially the same thickness. If they are to have a different thickness, it is preferred that second channel vent 110 has a thickness in the range of from about 0.012 to about 0.020 inches, and that first channel vent has a thickness greater than about 0.020 inches.

Figure 7:
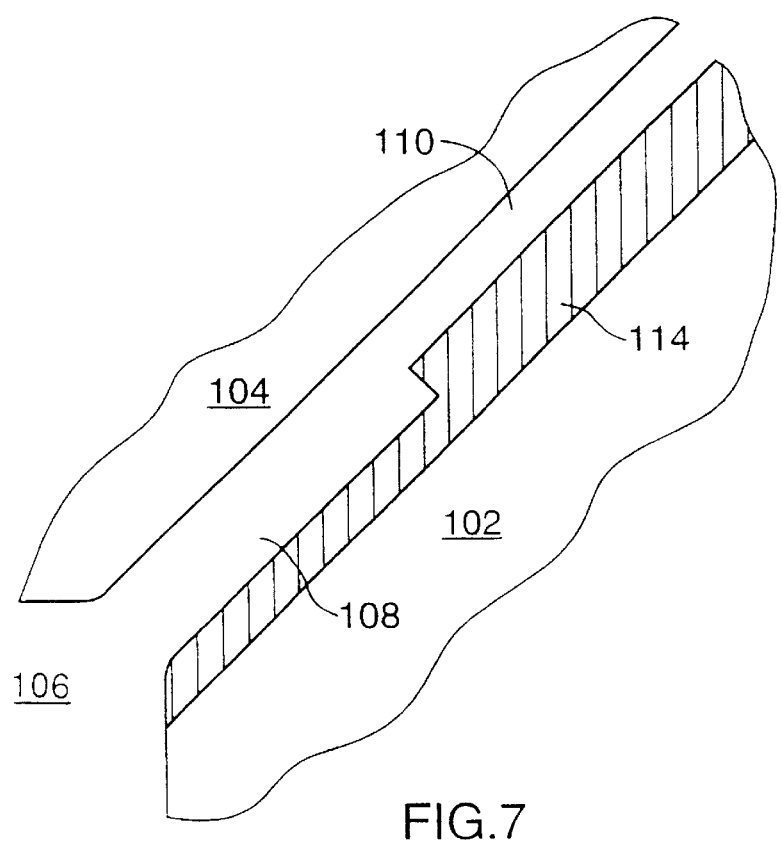
FIG. 7 illustrates an enlarged view of section A of FIG. 6.

With reference to FIG. 7, there is illustrated an enlarged portion of the mold in FIG. 6. Specifically, in FIG. 7, the difference in thickness between first channel vent 108 and second channel vent 110 is readily apparent. Further, FIG. 7 is useful in illustrating the preferred manner by which first channel vent 108 and second channel vent 110 may be disposed in lower mold 102. Specifically, this can be done by casting the respective channel vents into a resinous material 114 (e.g., an epoxy resin). This can be done by obtaining the resinous material in an uncured state, dispensing the resinous material in this state on the parting line surface of lower mold 102, casting a depression in the resinous material in the shape of the desired channel vent (first and/or second channel vent) and curing the resinous material as it is cast (it is preferred to use a suitable release agent between the cast and the resinous material as the latter is curing). After curing, the resinous material permanently assumes the shape of the desired channel vents and is adhered to lower mold 102. Alternatively, first channel vent 108 and second channel vent 110 can be machined into a pre-formed resinous material layer or even into the metal (e.g., aluminum) used to construct the mold.

In use, mold 100 operates in the following manner. Liquid foamable polymeric composition (e.g., a liquid foamable polyurethane composition) is dispensed into mold cavity 106, and upper mold 104 and lower mold 102 are sealingly engaged. The air in mold cavity 106 and the gases produced by the chemical reaction occurring in the expanding composition are vented initially toward channel vent 108 in the direction shown by dashed arrows 116 in FIG. 5. The gases are such that they flow relatively easily into channel vent 108. Once inside first channel vent 108, the gases flow toward second channel vent 110 in the direction shown by dashed arrows 118 in FIG. 5. At this point the gases escape mold 100 by passing through second channel vent 110. While the opening to first channel vent 108 remains unobstructed, the gases flow relatively free from mold cavity 106, through first channel vent 108 and second channel vent 110, and ultimately exit mold 100 and there is a negligible pressure differential across the combined channel vents (i.e., across the entrance to first channel vent 108 and the exit from second channel vent 110. The dimensions of the channel vent are selected such that the expanding foamable polymeric composition will not enter first vent channel 108 until the pressure differential across the combined channel vents is sufficient to exceed the viscoelastic energy of the expanding mixture. Practically, this does not occur until the opening to first channel vent 108 has become obstructed by the expanding mixture, at which time the mold cavity should be substantially completely filled. The expanding mixture may or may not enter second channel vent 110. Under virtually all circumstances, the expanding mixture should not be allow to exit second channel vent 110.

Figure 8:
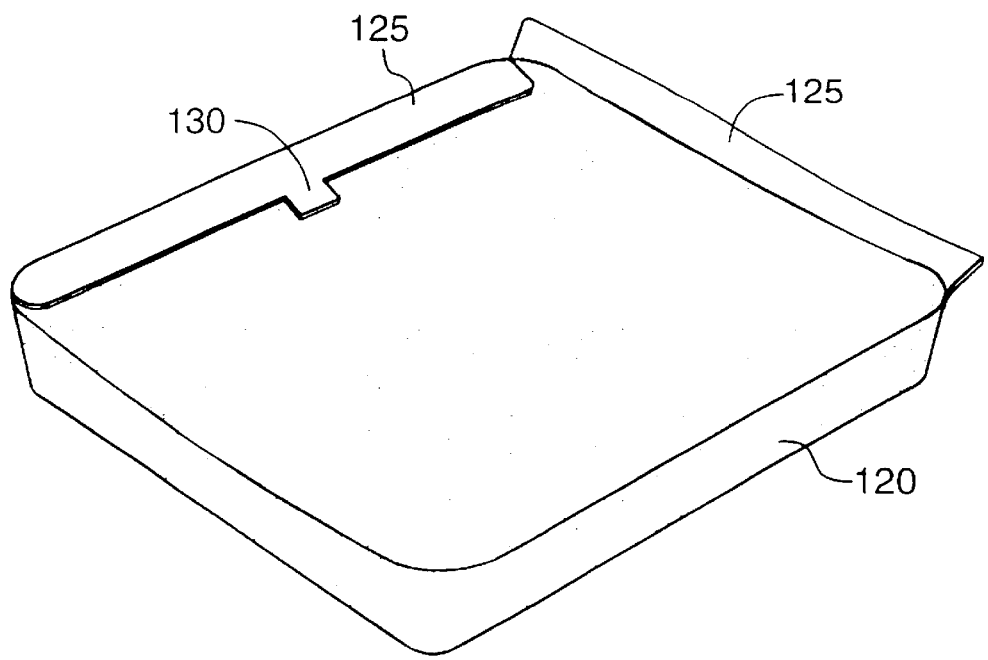
FIG. 8 illustrates an article produced in the mold shown in FIGS. 5 and 6.

FIG. 8 illustrates an article 120 fabricated in the mold of FIG. 5 employing first channel vent 108 and second channel vent 110 in accordance with the present invention. As illustrated, article 120 includes channel ribbons 125 of extruded material from first channel vent 108. For illustrative purposes, two channel ribbons 125 are shown with one of the ribbons folded back onto the article. Of course, the article may contain a continuous, single channel ribbon 125. A tab 130 is attached to portion of channel ribbon 125 which correspondence to a small ribbon of foam material which entered and cured in second channel vent 110 in mold 100 illustrated in FIG. 5. Again, in some instances, the expanding polymeric composition may not ingress second channel vent 110 and, in such cases, tab 130 may not be present.

The advantages accruing from the combination of the first channel vent and second channel vent of the present mold are numerous. The provision of the first channel vent allows gases to be vented from the mold cavity virtually anywhere along the periphery of the mold cavity. The channel ribbons attached to articles made using the present mold are less obtrusive than the ribbons created using the mold described in the Clark et al. patents. A key advantage of the present mold is that provision of such a first channel vent effectively removes the restrictions on location of conventional ribbon vents (e.g., as taught by the Clark et al. patents) normally imposed by the geometry of the article being produced. Thus, there is virtually no restriction on the placement of the second channel vent alone the length of the first channel vent. This allows for a significant reduction in the number of conventional ribbon vents required to achieve adequate venting. Also, an post-processing of the article (e.g., covering step in seat assembly) is greatly facilitated. Thus, the need to place individual ribbon vents at points in the parting line corresponding to gas collection points (e.g., high points in the upper mold) is obviated. For example, the use of full perimeter first channel vent 108 in combination with a sole second channel vent 110 provides adequate venting for an article which, if produced using conventional ribbon vents, would require the use of a mold having a minimum of 5–10 individual ribbon vents located at prerequisite positions along the parting line.

Figure 9:
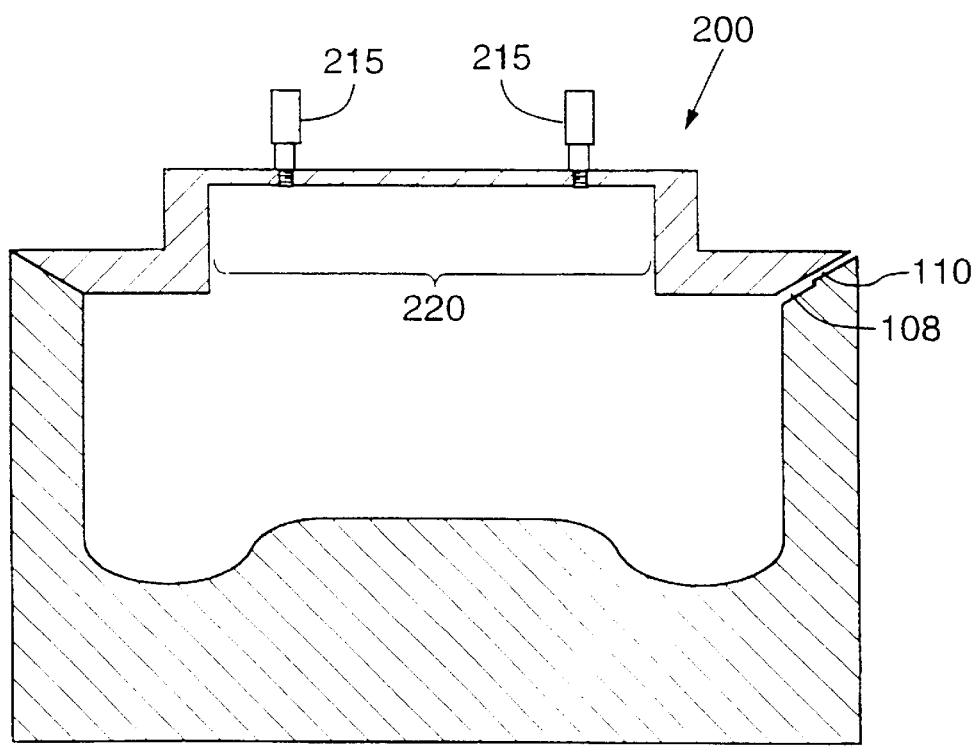
FIG. 9 illustrates a cross-section of another embodiment of a mold in accordance with the present invention.

It is contemplated that in many circumstances, it will be desired to combine in a single mold the first and second channel vents described hereinabove with the upper mold (or lid) vents illustrated in FIGS. 3–6 of the Clark et al. patents. Specifically, as shown in FIG. 9 hereof, a mold 200 may include one or more otherwise isolated regions 220 at which vent assemblies 215 may preferably be employed (pursuant to the specification of the Clark et al. patents, the teachings of which have been incorporated herein by reference), while first channel vent 108 and second channel vent 110 are employed at the parting line of the mold as described hereinabove. Due to their isolation from first channel vent 108 at the parting line of the mold, vent assemblies 215 are employed to ensure that gases which would otherwise be trapped in regions 220 are properly vented. The design of such a mold, will be clearly understood by those of skill in the art, in view of the description above and the teachings of the Clark et al. patents.

As will also be understood by those of skill in the art, further variations are possible without departing from the spirit of the invention disclosed herein.

What is claimed is:

1. A mold for producing foamed articles, the mold comprising an upper mold and a lower mold releasingly engageable in a closed position to define a mold cavity having a parting line about a periphery of the mold cavity, the parting line defining: (i) a first channel along a first length of a periphery of the mold cavity, and (ii) a second channel in communication with first channel, the second channel having a second length which is less than the first length, wherein the first channel has a thickness in the range of from about 0.005 to about 0.040 inches.

2. The mold defined in claim 1, wherein the mold cavity is substantially rectangular-shaped.

3. The mold defined in claim 1, wherein the first channel is disposed along at least a portion of one side of the periphery of the mold cavity.

4. The mold defined in claim 1, wherein the first channel is disposed along at least a portion of two sides of the periphery of the mold cavity.

5. The mold defined in claim 1, wherein the first channel is disposed along an entire side of the periphery of the mold cavity.

6. The mold defined in claim 1, wherein the first channel is disposed along an entire side and at least a portion of one adjacent side of the periphery of the mold cavity.

7. The mold defined in claim 1, wherein the first channel is disposed along the entire periphery of the mold cavity.

8. The mold defined in claim 1, wherein the first length is greater than about 1 inch.

9. The mold defined in claim 1, wherein the first length is greater than about 3 inches and the second length is less than about 3 inches.

10. The mold defined in claim 1, wherein the first length is greater than about 5 inches and the second length is less than about 3 inches.

11. The mold defined in claim 1, wherein the first length is greater than about 6 inches and the second length is less than about 3 inches.

12. The mold defined in claim 1, wherein the first channel and second channel are of a different thickness.

13. The mold defined in claim 12, wherein the thickness of the first channel is greater than the thickness of the second channel.

14. The mold defined in claim 1, wherein the first channel and the second channel are cast from a resinous material and adhered to at least one of the upper mold and the lower mold.

15. The mold defined in claim 14, wherein the resinous material is adhered to the lower mold.

16. The mold defined in claim 14, wherein the resinous material is an epoxy resinous material.

17. A mold for producing foamed articles, the mold comprising an upper mold and a lower mold releasingly engageable in a closed position to define a mold cavity having a parting line about a periphery of the mold cavity, the parting line defining: (i) a first channel along a first length of a periphery of the mold cavity, and (ii) a second channel in communication with first channel, the second channel having a second length which is less than the first length, wherein the first channel has a thickness in the range of from about 0.007 to about 0.035 inches.

18. A method of producing an article in a mold comprising an upper mold and a lower mold releasingly engageable in a closed position to define a mold cavity having parting line about a periphery thereof, the method comprising the steps of:
  dispensing a liquid foamable polymeric composition into the mold cavity;
  closing the upper mold and the lower mold; allowing the liquid foamable polymeric composition to expand to substantially fill the mold cavity;
  venting gases in the mold cavity through a combination comprising: (i) a first channel along a first length of the periphery of the mold cavity, and (ii) a second channel in communication with first channel, the second channel having a second length which is less than the first length, wherein the first channel has a thickness in the range of from about 0.007 to about 0.035 inches.

19. A method of producing an article in a mold comprising an upper mold and a lower mold releasingly engageable in a closed position to define a mold cavity having parting line about a periphery thereof, the method comprising the steps of:
  dispensing a liquid foamable polymeric composition into the mold cavity;
  closing the upper mold and the lower mold; allowing the liquid foamable polymeric composition to expand to substantially fill the mold cavity;
  venting gases in the mold cavity through a combination comprising: (i) a first channel along a first length of the periphery of the mold cavity, and (ii) a second channel in communication with first channel, the second channel having a second length which is less than the first length, wherein the first channel is substantially rectangular in cross-section and the liquid foamable polymeric composition entering the first channel results in a first ribbon of polymeric material attached to the article.

20. The method defined in claim 19, wherein mold cavity said closing step is conducted prior to substantially complete filling of the mold cavity by the liquid foamable polymeric composition.

21. The method defined in claim 19, wherein the first channel is disposed along at least a portion of one side of the periphery of the mold cavity.

22. The method defined in claim 19, wherein the first channel is disposed along at least a portion of two sides of the periphery of the mold cavity.

23. The method defined in claim 19, wherein the first channel is disposed along an entire side of the periphery of the mold cavity.

24. The method defined in claim 19, wherein the first channel is disposed along an entire side and at least a portion of one adjacent side of the periphery of the mold cavity.

25. The method defined in claim 19, wherein the first channel is disposed along the entire periphery of the mold cavity.

26. The method defined in claim 19, wherein the first length is greater than about 1 inch.

27. The method defined in claim 19, wherein the first length is greater than about 3 inches and the second length is less than about three inches.

28. The method defined in claim 19, wherein the first length is greater than about 5 inches and the second length is less than about 3 inches.

29. The method defined in claim 19, wherein the first length is greater than about 6 inches and the second length is less than about 3 inches.

30. The method defined in claim 19, wherein the first channel and second channel are of a different thickness.

31. The method defined in claim 30, wherein the thickness of the first channel is greater than the thickness of the second channel.

32. The method defined in claim 19, wherein the second channel is substantially rectangular in cross-section and the liquid foamable polymeric composition entering the second channel results in a second ribbon of polymeric material attached to the first ribbon of polymeric material.

33. The method defined in claim 32, comprising the further step of folding back both the first ribbon and second ribbon of polymeric material against the article and applying a finishing cover to the article.

34. The method defined in claim 19, comprising the further step of folding back the first ribbon of polymeric material against the article and applying a finishing cover to the article.

35. A method of producing an article in a mold comprising an upper mold and a lower mold releasingly engageable in a closed position to define a mold cavity having parting line about a periphery thereof, the method comprising the steps of:

dispensing a liquid foamable polymeric composition into the mold cavity;

closing the upper mold and the lower mold; allowing the liquid foamable polymeric composition to expand to substantially fill the mold cavity;

venting gases in the mold cavity through a combination comprising: (i) a first channel along a first length of the periphery of the mold cavity, and (ii) a second channel in communication with first channel, the second channel having a second length which is less than the first length, wherein the first channel has a thickness in the range of from about 0.005 to about 0.040 inches.

\* \* \* \* \*